Aug. 3, 1954

J. E. McEVOY ET AL 2,685,203

THERMAL CONVERTER FOR MEASURING AND CONTROLLING SYSTEMS

Filed Nov. 19, 1949

INVENTORS
JAMES E. McEVOY
AND ANTHONY J. HORNFECK
BY Raymond D. Jenkins
ATTORNEY

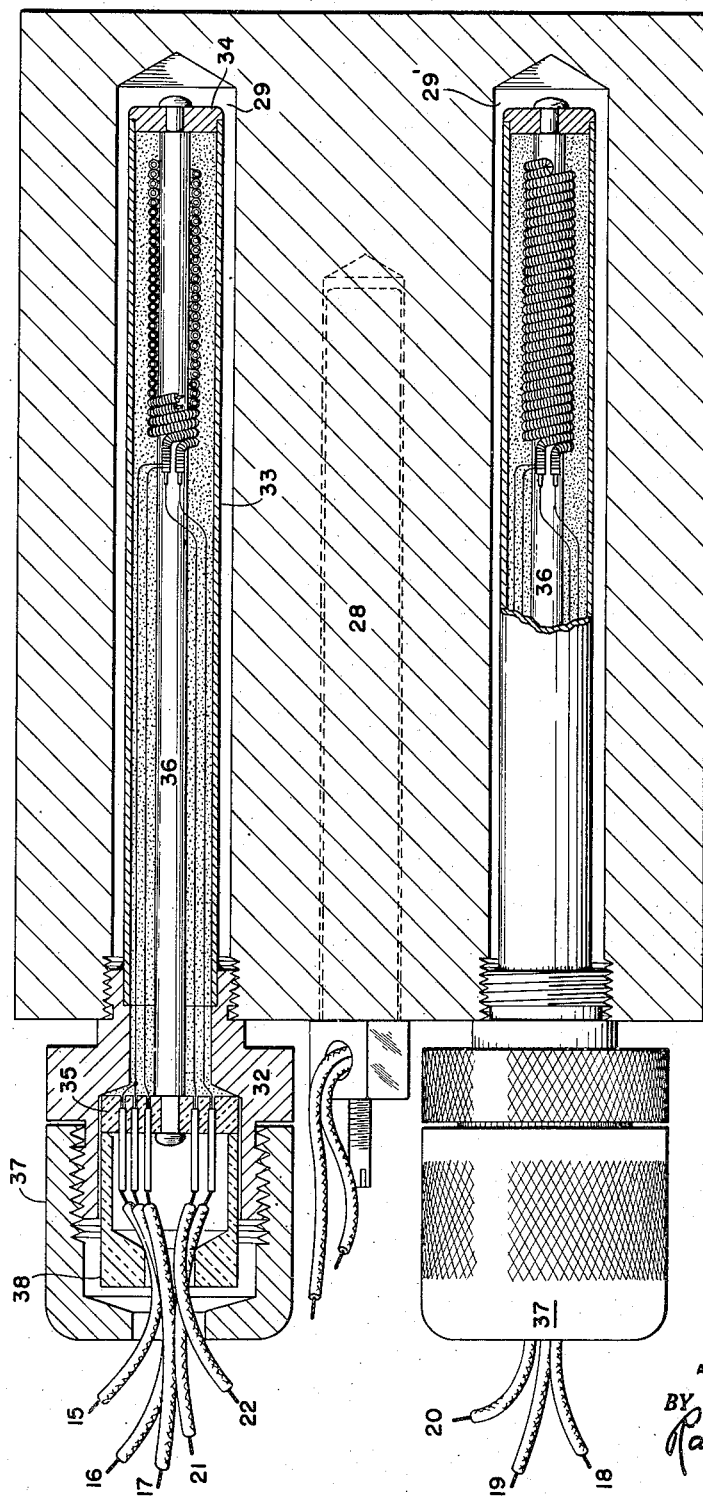
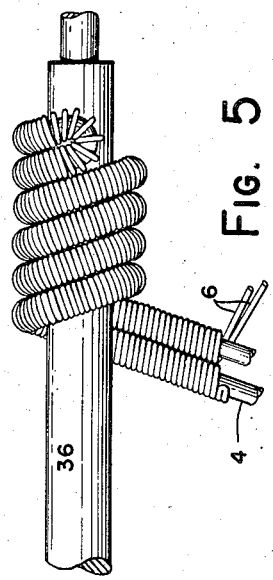
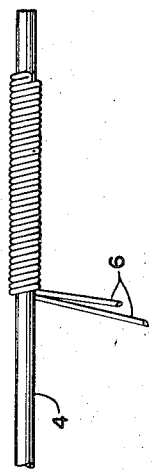

INVENTOR.
JAMES E. McEVOY
AND ANTHONY J. HORNFECK
BY
ATTORNEY

Patented Aug. 3, 1954

2,685,203

UNITED STATES PATENT OFFICE 2,685,203

THERMAL CONVERTER FOR MEASURING AND CONTROLLING SYSTEMS

James E. McEvoy, Cleveland, and Anthony J. Hornfeck, Lyndhurst, Ohio, assignors to Bailey Meter Company, a corporation of Delaware Application November 19, 1949, Serial No. 128,454

6 Claims. (Cl. 73—362)

Our invention relates to an article of manufacture which we term a "thermal converter." While this is a designation having broad possibilities of interpretation, it has however acquired a definite status and meaning in the general art of the metering and controlling of variable conditions, values, and the like.

In general, an electric heater is energized proportionately to a variable to be measured and the rate of heat which is dissipated by the heater is measured in terms of the variable. The method of measurement is known and has been used to bias electric network components as well as to form a basis for electric power measurement.

Our invention resides in an improved apparatus or article of manufacture having applicability in the measuring and controlling of variables. It is not limited to use with the measuring and/or controlling systems of any one manufacturer or inventor, but may well be used to advantage in widely varying types of systems; it only being necessary that the variable to be measured is capable of expression through the measurable heat dissipation of an electric heater. While the art has proposed similar uses of this measuring theory there has not been previously available, so far as we can ascertain, any "thermal converter" as an article of manufacture on the market or available by purchase for adaptation or use by manufacturers or users or the general public.

In the drawings:

Fig. 3 is a partially sectioned elevation of the device of Fig. 2.

Figs. 4 and 5 show in large details of Fig. 3.

Figs. 5 and 6 are characteristic performance curves of a commercial thermal converter of our invention.

Basically our thermal converter comprises a heater and a temperature element arranged in unitary assembly; and preferably cooperating with a reference unit in a temperature controlled total assembly. The heater may receive electric energy varying as the variable to be measured. The temperature element is sensitive to temperature of the heater and is preferably connected in a measuring circuit in which is also connected the temperature controlled reference unit. Our invention provides a highly accurate, sensitive and commercial article of manufacture including the mentioned elements.

Figure 1:
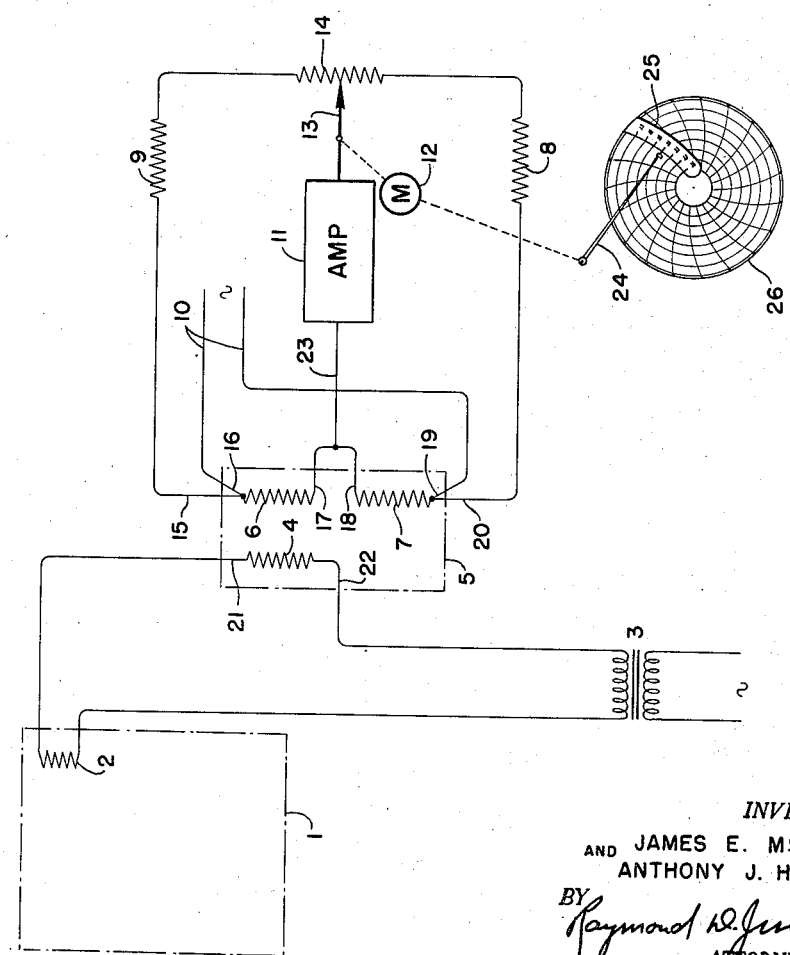
Fig. 1 is a diagrammatic wiring diagram of a measuring system including our invention.

Referring now to Fig. 1 it will be seen that an enclosure 1 is to be heated by a main power heater 2 receiving energy from a power source 3. In series with the power heater 2 is a measuring heater 4 receiving heating energy continually proportionate to, and representative of, the heating of heater 2. Thus a measure of the heat dissipated by heater 4 becomes inferentially a measure of the power dissipated as heat by power heater 2. At 5 we diagrammatically show our thermal converter assembly which is shown in perspective assembly in Fig. 2.

Intimately associated with measuring heater 4 (in assembly 5) is the temperature element 6 responsive to the heat of heater 4. The reference unit 7 is identical in physical form to 6 and is within the assembly 5 but separate from the closely associated sub-assembly 4, 6.

In the present illustrative embodiment we provide two resistance wires, one of which is subjected to heat whose degree is proportional to or representative of the electric power dissipated at 2, while the other is an ambient temperature compensating reference wire. These resistance wires, 6 and 7, are arranged in a Wheatstone bridge whose other legs are indicated at 8 and 9. The bridge is supplied from a source 10 and has a balancing potentiometer 14 engaged by an adjustable contact arm 13 positioned by a motor 12.

Element 6 has three conductor leads 15, 16, 17, reference unit 7 has leads 18, 19, 20 and heater 4 has leads 21, 22; all leaving the assembly 5, as shown in the various views of the drawing.

In the conjugate conductor 23, joining the junction of 17, 18 with the arm 13, is an amplifier-motor control 11 arranged upon unbalance of the bridge to energize motor 12 in proper direction to move arm 13 along 14 to restore the bridge to balance. Motor 12 is also adapted to position an indicator 24 relative to an index 25 and to a time revoluble chart 26 thereby providing a visual indication and a continuous record in known manner. Index 25 and chart 26 may be graduated in desired units representing the measure of electric heating at power heater 2, i. e. the variable being measured in this example.

Figure 2:
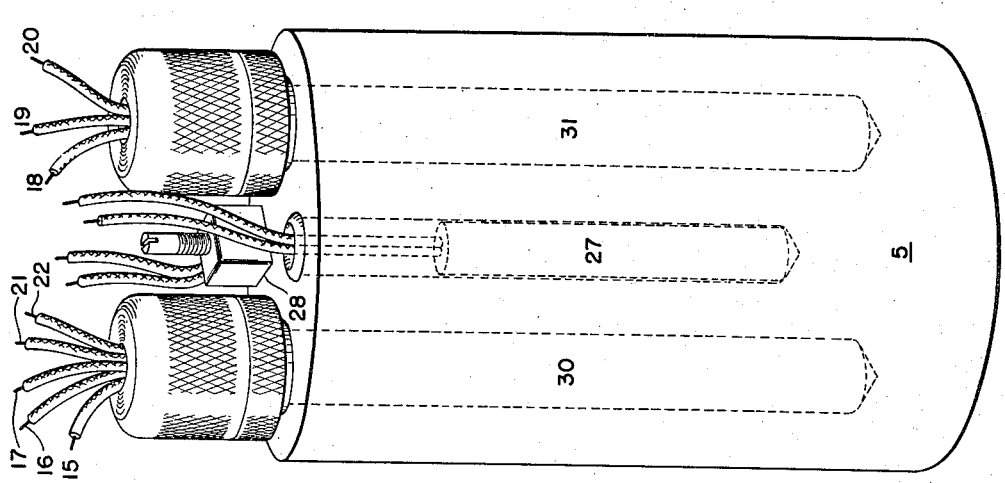
Fig. 2 is a perspective view of a thermal converter assembly.

In Fig. 2 we diagrammatically show the assembly 5 as preferably comprising a cylindrical metal block in which are located the various elements or units. The block may be of brass or aluminum and of a mass sufficient to mechanically contain the various units in such spaced relation as to be substantially unaffected by variations in ambient temperature surrounding the block assembly. To this end we include in the assembly, besides the unit 4—6 and the unit 7, a small electric heater 27 which is thermostatically controlled by a thermostat 28. The arrangement provides that the elements 4, 6, 7 are continually surrounded by heat storage metal maintained at a temperature about 30° F. above normal ambient air temperature. Thus the units 4, 6, 7 are normally unaffected by variations in ambient air temperature.

Referring now to Fig. 3 we show therein in sectional elevation the assembly 5 including the various elements previously mentioned except for the block heater 27. The block is provided with two symmetrical wells 29, 29' in which are interchangeably located the assemblies 30, 31 which will now be described more in detail. In the description to follow it will be noted that the assembly 30 contains the elements 4, 6 while the assembly 31 contains the element 7. Externally as to size and shape the assemblies 30, 31 may be identical except as to the number of lead wires projecting therefrom. They may, in fact, be identical with two of the lead wires unused in the one case.

The assembly 30 includes a cap portion 32, a cylindrical shell 33 and a base 34, providing a metallic protective shield around the assembly of wires 4 and 6 to the end that said assembly 30 may be packaged and handled without fear of damage to the heater and measuring wires. Within a recess of the cap portion 32 is a terminal block 35 of insulating material. The assembly comprising the parts 32, 33, 34 and 35 may be mechanically held together through the agency of a centrally located rod 36 which also provides a support for the wires 4, 6.

Preferably the central support rod 36 is a metallic rod which may be covered with glass tape or with other insulating material such as a ceramic tube.

The cap portion 32 is provided with male threads adjacent the cylindrical shell 32 to the end that the assembly 30 may be screwed into mating female threads in the open end of the well 29. Preferably the assembly is screwed in only finger tight so that there will be no tendency to freeze to the metal of the thermal block. The cap portion 32 is further provided at its outer end with threads to which may be fitted a protecting metal cap 37. Within the cavity of the cap 32 the terminal block 35 carries the terminals to which conductors 15, 16, 17, 21 and 22 are fastened and the cap 32 also contains an insulating member 38 protecting the terminals and conductor junctions.

We come now to a preferred assembly of wires 4 and 6 around the support rod 36 and within the shell 33.

Fig. 4 shows that the temperature element wire 6 is first doubled and then wound non-inductively around the measuring heater wire 4 to completely cover the latter. In one commercial form the heater wire 4 consisted of about 15 in. of uncoated No. 26 Advance wire with a resistance of about 1.4 ohms. The temperature element wire 6 consisted of No. 36 Grade A nickle wire, glass coated, and its resistance at 75° F. was approximately 28 ohms. The thermal converter element was then wound on the central support rod 36 which had been covered with glass tape. Leads are brought up to the terminals posts in a Bakelite terminal block 35. Fig. 5 shows the general method of winding.

Reference to Fig. 3 reveals that the thermal converter element 4—6 is helically wound on the lower third of the central support rod. In some arrangements a ceramic tube is used to cover the central metal support rod 36 in place of glass tape to insure equal mass in both the converter element 30 and the compensating element 31.

The assembly was close wound as illustrated to obtain the maximum possible temperature rise from the heat released by the heater 4. All of the heat generated in the heater is passed through the temperature element, and all of the heat generated serves to raise the temperature of the temperature element. This method of winding insures good stable contact between the temperature element and the heater and a large temperature rise of the element for a given heat input.

The assembly of wires 4—6 about rod 36 is placed at the bottom of the relatively long thin-wall socket 33 to establish a fairly long uniform path for heat to flow toward the head of the socket. The clearance between the shell 33 in the well 29 is held to a small amount to limit the circulation of convection currents in the clearance space. It is desirable that all heat transfer from the hot end of the assembly take place by straight conduction, because such heat transfer results in a uniform characteristic of heat input vs. temperature rise, due to the linear variation of heat flow and temperature difference.

A compensating element 31 is constructionally identical with the measuring assembly 30 so that there will be no difference in mass between the two assemblies. This is accomplished by including a dummy heater wire (similar to 4) although no leads are taken from it at the corresponding dummy terminal posts. Preferably both elements are packed in their socket shells 33 with MgO to insure a uniform path for the flow of heat from the socket and to eliminate the possibility of variable contact pressure between the element and the socket.

Figure 6:
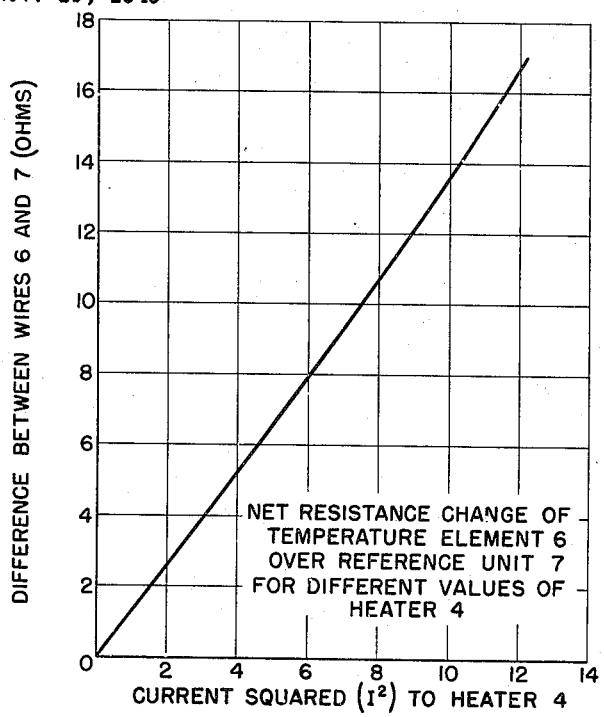
Figure 7:
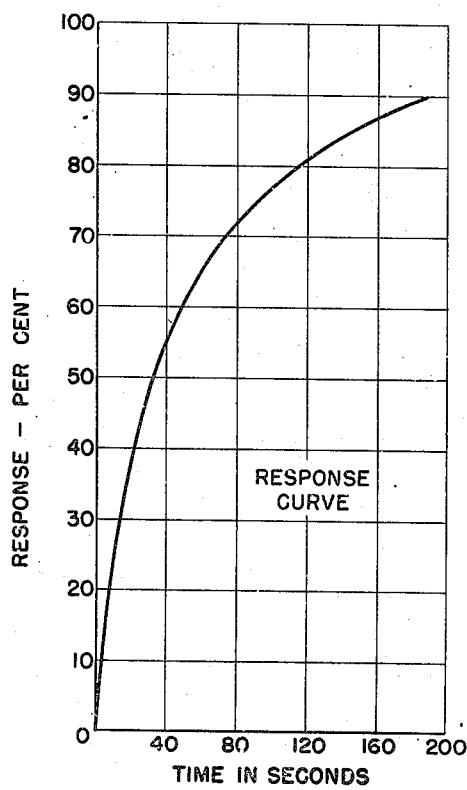

Typical data from such a commercial structure is plotted in Figs. 6 and 7. We show in Fig. 6 a typical characteristic curve in which we have plotted the difference in resistance of measuring element wires 6 and 7 in ohms for an increasing supply of current squared to heater 4. The ohmic change in resistance of measuring element 6 as compared to its reference element 7 is of course the value being used in the bridge circuit as a measure of temperature received by said elements 6 and 7. Preferably the curve of Fig. 6 would be a straight line, but due to the increasing temperature coefficient of resistance of nickel with temperature, the characteristic has a slight upward curvature although for all practical purposes the plot is a linear one.

In Fig. 7 we plot a response curve wherein the time for 60% of response for this particular recorder was 50 seconds. This is quite satisfactory for commercial operation in measuring and controlling systems.

While we have chosen to describe one particular commercial embodiment, we would point out that the sensitivity, speed of response, and similar characteristics may be shifted the one relative to another by variations in the design and construction. For example, whether or not the assembly is packed in the shell 33 with MgO or surrounded with air, the material and thickness of the shell 33, and its closeness of fit upon insertion in the well 29 or 29'. Whether or not the shell 33 is packed with some material such as MgO in the well 29. Also the material of the block 5 itself may be varied and in preferred form may be aluminum or brass. In any event it will be understood that we have chosen to illustrate and describe certain preferred forms of construction and arrangement but that these are illustrative and by way of example.

What we claim as new, and desire to secure by Letters Patent of the United States, is:

1. A thermal converter assembly including, a power element wound non-inductively about a support rod member and adapted to dissipate a portion of its electrical energy as heat, a temperature measuring element wound non-inductively about the power element and adapted to detect the heat dissipated, a socket member with a head and body section, an insulating base supported in said head section for element terminals and support of the support rod for the elements, an insulating cover in said head section over the element terminals in their supporting base, means of access for conductors from said terminals through the insulating cover and cap of the head section, a sealing member at the bottom of said body section supporting the end of the element supporting rod, a material packed about the rod and supported elements within the socket body section of a higher thermal conductivity than air, a solid metallic housing with symmetrical wells into one of which said body section extends, means of supporting said socket in the well of said housing from its head section, and a heater in one of the wells for maintaining the housing above ambient temperature.

2. The thermal converter of claim 1 including a second socket arranged in a second well of said housing with its power element not adapted for energy conversion but which maintains its position for thermal balance between the two sockets.

3. As an article of manufacture, the thermal converter assembly for use in measuring and/or controlling systems, an elongated hollow metallic container provided with an opening at one end, an insulated terminal block closure for the container positioned at the open end, a central support rod attached to the terminal block passing axially into the container, a heater wire, a temperature responsive resistance wire closely coiled on the heater wire with each coil touching but electrically insulated from the next coil, said wires wound coiled-coil around said support rod opposite the terminal block with each coiled-coil touching the adjacent coiled-coil, and lead wires joining the said heater wire and the responsive wire with the terminal block.

4. As an article of manufacture a thermal converter unit for use in measuring and/or controlling systems, in combination, a relatively massive metallic heat equalizing block having two parallel spaced wells, a pair of thermal converter assemblies as claimed in claim 3 removably inserted in said wells, one of the assemblies having a dummy winding and a reference measuring winding, and thermostatically controlled heater means also buried in said block for maintaining the unit at a substantially uniform reference temperature above any expected ambient temperature.

5. The unit of claim 4 wherein the two converter assemblies are mechanically interchangeable, and a Wheatstone bridge circuit in which the measuring wire of each assembly are a part, the one only heater wire being energized.

6. The assembly of claim 3 wherein the said hollow metallic container is filled with magnesium oxide around said rod and coiled-coil wires.

References Cited in the file of this patent

UNITED STATES PATENTS

| Number | Name | Date |
|---|---|---|
| 621,604 | Gold | Mar. 21, 1899 |
| 1,190,978 | Bliss | July 11, 1916 |
| 1,411,396 | Wilson et al. | Apr. 4, 1922 |
| 1,829,649 | Harrison | Oct. 27, 1931 |
| 1,860,544 | Krueger et al. | May 31, 1932 |
| 1,902,427 | Sawyer | Mar. 21, 1933 |
| 2,131,065 | Obermaier | Sept. 27, 1938 |
| 2,379,530 | Lederer | July 3, 1945 |
| 2,444,410 | Keinath | June 29, 1948 |
| 2,612,047 | Nilsson et al. | Sept 30, 1952 |